(12) United States Patent
Mozolewski (10) Patent No.: US 10,187,297 B2
(45) Date of Patent: Jan. 22, 2019

(54) CLASSIFICATION WITH A SWITCH

(71) Applicant: HEWLETT PACKARD ENTERPRISE DEVELOPMENT LP, Houston, TX (US)

(72) Inventor: Mark Brian Mozolewski, Roseville, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 36 days.

(21) Appl. No.: 15/501,789

(22) PCT Filed: Oct. 27, 2014

(86) PCT No.: PCT/US2014/062342
§ 371 (c)(1),
(2) Date: Feb. 3, 2017

(87) PCT Pub. No.: WO2016/068832
PCT Pub. Date: May 6, 2016

(65) Prior Publication Data
US 2017/0230279 A1 Aug. 10, 2017

(51) Int. Cl.
*H04L 12/721* (2013.01)
*H04L 12/823* (2013.01)
*H04L 12/723* (2013.01)
*H04L 29/06* (2006.01)
*H04L 12/54* (2013.01)

(52) U.S. Cl.
CPC .............. *H04L 45/26* (2013.01); *H04L 45/50* (2013.01); *H04L 47/32* (2013.01); *H04L 69/22* (2013.01); *H04L 12/5691* (2013.01); *H04L 45/566* (2013.01)

(58) Field of Classification Search
CPC ......... H04L 47/10; H04L 47/12; H04L 47/20; H04L 47/24; H04L 47/32; H04L 47/38; H04L 47/70; H04L 47/72; H04L 47/74; H04L 47/78; H04L 47/80; H04L 43/00; H04L 43/50; H04B 17/00; H04B 3/46; H04W 24/00
See application file for complete search history.

(56) References Cited

U.S. PATENT DOCUMENTS

| 2006/0056412 A1* | 3/2006 | Page .................. H04L 45/02 370/392 |
| 2006/0239219 A1 | 10/2006 | Haffner et al. |
| 2007/0076606 A1 | 4/2007 | Olesinski et al. |
| 2011/0040706 A1 | 2/2011 | Sen et al. |
| 2013/0266007 A1 | 10/2013 | Kumbhare et al. |

(Continued)

OTHER PUBLICATIONS

Ian F. Akyildiz et al., "A Roadmap for Traffic Engineering in SDN-OpenFlow Networks," Jun. 19, 2014, pp. 1-30, Computer Networks 71 (2014).

(Continued)

*Primary Examiner* — Dady Chery
(74) *Attorney, Agent, or Firm* — Hewlett Packard Enterprise Patent Department (57) ABSTRACT

A switch receives a data packet containing training information. The switch learns a classifier based on the training information in the data packet, the classifier useable to classify data into at least one category.

14 Claims, 4 Drawing Sheets

(56) References Cited

U.S. PATENT DOCUMENTS

2013/0318243 A1 11/2013 Chinthalapati et al.
2014/0254379 A1 9/2014 Dhananjay et al.

OTHER PUBLICATIONS

International Search Report and Written Opinion, International Application No. PCT/US2014/062342, dated Jul. 14, 2015, pp. 1-11, KIPO.
Runxin Wang, "Advances in Machine-Learning-Based Traffic Classifiers," Aug. 29, 2013, pp. 1-3, Ripe NCC.
Zafar Qazi et al, "Application-Awareness in SDN," SIGCOMM'13, Aug. 12-16, 2013, Hong Kong, China, pp. 1-2, ACM.

* cited by examiner

CLASSIFICATION WITH A SWITCH

BACKGROUND

A classifier can be built for classifying data into one or multiple categories. With supervised machine learning, a classifier can be built or learned using training data. Training data includes a set of data samples that have been labeled with respect to at least a specific category for which the classifier is to be built or updated (a process referred to as learning or training the classifier).

BRIEF DESCRIPTION OF THE DRAWINGS

Some implementations are described with respect to the following figures.

DETAILED DESCRIPTION

Traditionally, to build or update a classifier (a process referred to as learning or training a classifier), training data is provided to a central server computer or multiple central server computers. In the ensuing discussion, learning a classifier and training a classifier are used interchangeably. Training data includes data samples that have been labeled with respect to at least one category for which the classifier is to be trained; in other words, each data sample includes an indication of whether the data sample is positive or negative with respect to the at least one category. The server computer(s) can apply a machine learning technique to learn the classifier based on the labeled data samples. Once the classifier is learned, the classifier can be used by the server computer(s) to classify unlabeled data, or alternatively, the classifier can be communicated to another computer node (or computer nodes) to apply classification on unlabeled data.

In examples where there is a relatively large amount of data, the process of copying or sending the data through a communications network to the server computer(s) for learning a classifier or for classification by the classifier can impose a large burden on the communications network. Moreover, an enterprise may have to invest in more powerful server computer(s) to ensure that the server computer(s) can handle the large amount of data, either for learning a classifier based on the data or for applying the classifier to the data.

In accordance with some implementations, rather than rely just on server computer(s) for classification tasks (including learning classifiers and/or applying classifiers to classify data), the processing resources of a communications network itself can be leveraged to perform the classification tasks, either in place of or in addition to the server computer(s). A communications network can include switches for forwarding data packets through the communications network. A switch receives a data packet and, based on the content of certain fields in the data packet and according to forwarding information, the switch forwards the data packet over a link selected from among multiple possible links, for propagation to a destination. A switch can be a layer 2 (L2) switch (e.g. an Ethernet switch that routes data packets based on Media Access Control (MAC) addresses) or a layer 3 (L3) router (e.g. an Internet Protocol (IP) router that routes data packets based on IP addresses). More generally, a switch can refer to any communication node that is able to receive a data packet, and based on content of selected field(s) in the data packet, is able to select one of multiple output paths over which the data packet is to be forwarded.

A switch can be a physical switch, or alternatively, a switch can be a virtual switch (implemented with machine-readable instructions that execute on a processor or multiple processors).

In accordance with some implementations, the classification tasks that can be performed by one or multiple switches of a communications network include learning a classifier based on training data, and/or applying a classifier to classify data with respect to one or multiple categories.

Once a classifier is learned by a switch, the learned classifier can be used by the switch to classify data. Alternatively or additionally, the switch can also send a representation of the learned classifier to another node (e.g. another switch, a server computer, etc.) to allow the other node to use the learned classifier to classify data, or to analyze the representation of the learned classifier to understand network traffic through the communications network.

Figure 1:
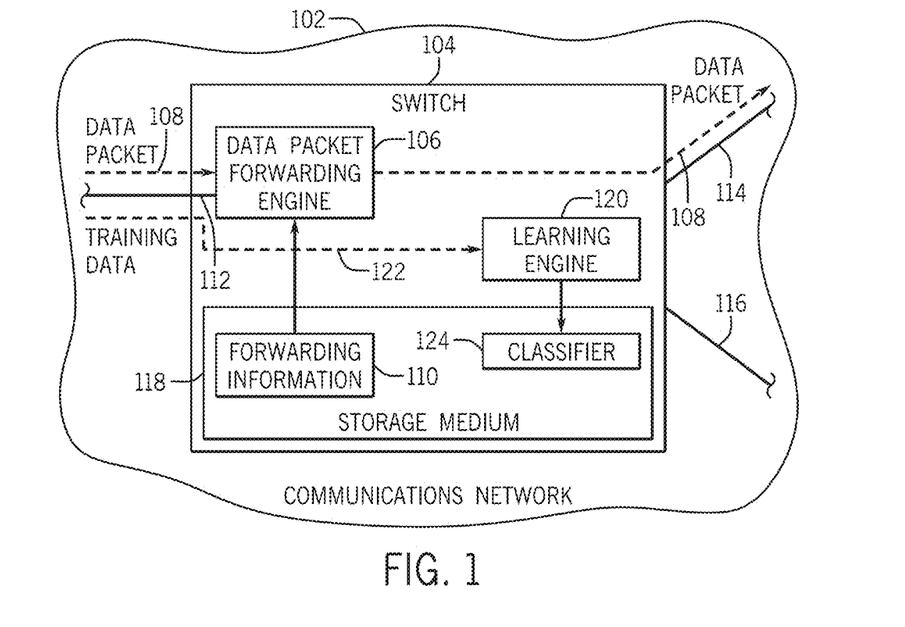
FIG. 1 is a block diagram of an example arrangement that includes a communications network and a switch that is capable of learning a classifier, in accordance with some implementations.

FIG. 1 is a schematic diagram of a communications network 102 that includes a switch 104. Although just one switch is shown in FIG. 1, it is noted that there can be multiple switches in the communications network 102, where the switches are interconnected with each other to perform forwarding of data packets from a source to a destination. As noted above, a switch can forward a data packet according to forwarding information accessible by the switch. The forwarding information can be in the form of one or multiple tables that contain entries corresponding to different combinations of values of fields that are to be matched. A data packet received by a switch can include several fields, set to respective values, that can be matched to the forwarding table(s) accessible by the switch. The values of the fields in the received packet can match to any respective entry of a forwarding table, and this matched entry can specify a port, from among multiple ports of the switch, to which the switch is to communicate the data packet. The ports of the switch are connected to respective network links that are coupled to other switches or other devices.

In examples where there are multiple forwarding tables used by a switch, such multiple forwarding tables can be chained together. If a value of a first field in a data packet matches an entry of a first of the chained tables, then the switch can proceed to match a value of another field in the packet to an entry of a second of the chained tables. This process can continue depending upon how many forwarding tables are in the chain. An example protocol that employs chained forwarding tables is an OpenFlow protocol, an example of which is described in the OpenFlow Switch Specification, by the Open Networking Foundation, Version 1.3.0, dated Jun. 25, 2012. With the OpenFlow protocol, the forwarding tables are referred to as "flow tables." The OpenFlow protocol specifies fields of a data packet that are to be matched to one or multiple flow tables of the switch.

As shown in FIG. 1, the switch 104 includes a data packet forwarding engine 106 to perform forwarding of a data packet 108 using forwarding information 110 accessible by the data packet forwarding engine 106. As used in this disclosure, an "engine" can refer to a physical processing hardware (e.g. one or multiple processors), or a combination of physical processing hardware and machine-readable instructions, that can perform specified tasks.

The data packet 108 is received by the data packet forwarding engine 106 over a first link 112 (through a first port of the switch 104), and the data packet forwarding engine 106 can forward the data packet 108 to one of multiple ports of the switch that are connected to respective links 114, 116. The forwarding is based on matching values of fields in the data packet 108 to entries of the forwarding information 110.

The forwarding information 110 is stored in a storage medium 118 in the switch 104. In other examples, the forwarding information 110 can be stored on a storage medium that is external of the switch 104.

Figure 2:
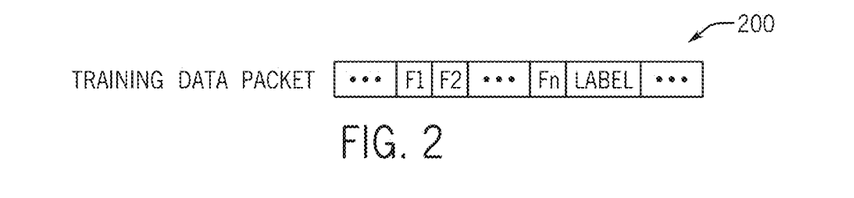
FIG. 2 is a schematic diagram of an example training data packet according to some implementations.

In accordance with some implementations, the switch 104 also includes a learning engine 120 that is able to receive training data 122, such as over the link 112 or another link. The training data 122 can include one or multiple training data packets. As shown in FIG. 2, each training data packet 200 contains training information, which can include values of specific fields (e.g. F1, F2, Fn) of the data packet, and a label (designated "LABEL" in FIG. 2) for a category that the values of the fields match to. More generally, a training data packet contains features that are relevant for a classifier, with values set for the features. In addition, the training data packet has been labeled by a user or another entity as being positive or negative with respect to a category for the classifier. In FIG. 2, the value of LABEL can be set to a first value to indicate that the training data packet is positive for the category, and can be set to a second value to indicate that the training data packet is negative for the category. The labeling of the training data packet as being positive or negative with respect to the category is based on the specific values for the respective features in the training data packet.

If a first set of values of the features is indicative of the training data packet being positive for the category (in other words, the training data packet should be classified as belonging to the category), then a label in the training packet is set to indicate that the training packet is positive for the category. On the other hand, if a second, different set of values of the features is indicative of the training data packet being negative with respect to the category (in other words, the training data packet should be classified as not belonging to the category), then a label in the training packet is set to indicate that the training packet is negative for the category.

Although reference is made to a training data packet containing training information for one category, it is noted that, in other examples, a training data packet can contain training information for multiple categories, in which case multiple labels can be added to indicate whether or not the training packet is positive or negative for the respective categories.

Based on the training data 122, the learning engine 120 can learn (or train) a classifier 124, which can be stored by the switch 104 in the storage medium 118. Alternatively or additionally, the classifier 124 (or a representation of the classifier 124) can be sent by the switch 104 to another node, such as another switch, a controller that performs control tasks with respect to the communications network 102, or another computer node.

In some examples, the classifier 124 can be a binary classifier (where the classifier is able to classify a data packet as either positive or negative with respect to a single category). More generally, the classifier 124 can be a multiclass classifier that can classify a data packet for multiple categories. In the ensuing discussion, it is assumed that the classifier 124 is a binary classifier, although techniques or mechanisms according to some implementations can be applied with multiclass classifiers.

Figure 3:
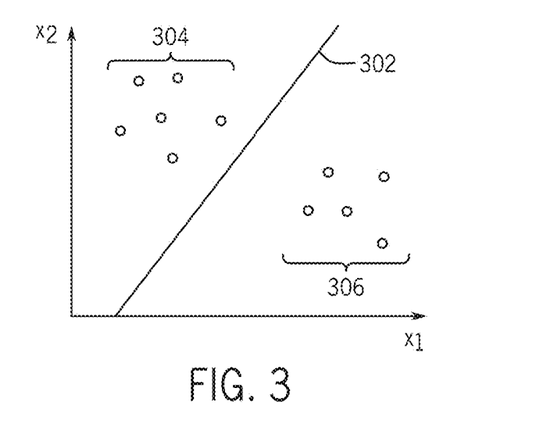
FIG. 3 is a graph illustrating classification of data samples according to some examples.

The classifier 124 in some examples can be a linear classifier. A linear classifier applies a weighted linear combination of features of a data packet to produce a classification result. A representation of a two-dimensional linear classifier (a classifier that classifies data using two features) is shown in the graph of FIG. 3. The horizontal axis of the graph represents a first feature, $x_1$, and the vertical axis of the graph represents a second feature, $x_2$. A weighted linear combination of the features $x_1$ and $x_2$ can be compared to a line 302 that divides data packets 304 and 306. Data packets 304 on one side of the line 302 are labeled as being positive with respect to a given category, while data packets 306 on the other side of the line 320 are labeled as being negative for the given category. The line 302 is learned by training the classifier using training data.

Note that if there are more than two features, then a hyperplane can be defined that separates data packets between those that are positive for a given category and those that are negative for the given category.

An example of a linear classification performed by a linear classifier is represented by the following equation:

$$f(x) = \begin{cases} +1 & \text{if } w \cdot x + b > 0 \\ -1 & \text{otherwise} \end{cases}.$$

In the above equation, $f(x)$ represents the label assigned to a data packet (e.g. positive or negative with respect to a given category), x represents the features of a data packet (e.g. $x_1$ and $x_2$ in FIG. 3), and w represents weights (e.g. $w_1$, $w_2$,•••) that are assigned to respective features $x_1$, $x_2$, . . . . In the foregoing equation, b represents a threshold, which can be learned.

In some implementations, learning the classifier 124 of FIG. 1 involves assigning values to the weights $w_1$, $W_2$,••••, for the corresponding features. The weight values are the parameters that make up the representation of the classifier 124. The learning of the weights attempts to find an optimal separating line (e.g. 302 in FIG. 3) or an optimal separating hyperplane for dividing data packets between those that are positive and negative with respect to a given category.

Although reference is made to linear classifiers in some examples, it is noted that techniques or mechanisms according to some implementations can also be applied to non-linear classifiers, for which a weighted non-linear combination of feature values can be applied for computing a classification result.

In some implementations, the switch 104 of FIG. 1 can perform two phases of classification tasks. The first phase involves training (or learning) the classifier 124. The second phase involves performing classification using the learned classifier 124.

Figure 4:
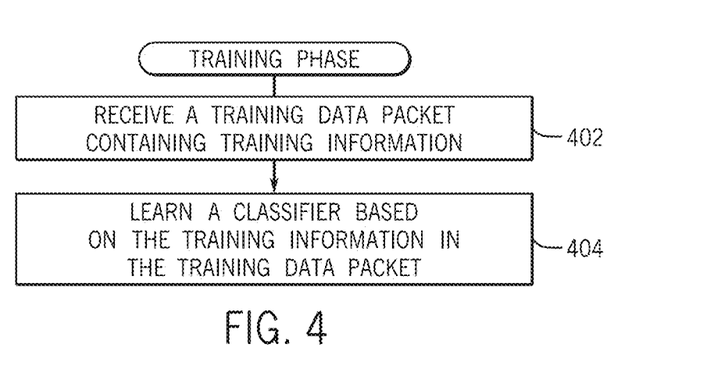
FIG. 4 is a flow diagram of an example training phase of a classifier according to some implementations.

An example process of the training phase is shown in FIG. 4, which can be performed by the switch 104, or more specifically, by the learning engine 120 in FIG. 1. The learning engine 120 receives (at 402) a training data packet that contains training information, such as shown in FIG. 2. The learning engine 120 then learns (at 404) the classifier 124 based on the training information in the training data packet, where the classifier 124 is usable to classify data into at least one category.

Although reference is made to receiving a training data packet, it is noted that the training phase can involve receiving multiple training data packets and iteratively learning the classifier based on the multiple training data packets.

Once the learning engine 120 has learned the classifier based on the training data packet, the learning engine 120 can either drop the training data packet (in other words, the training data packet is not forwarded by the switch 104 to another node), or alternatively, the learning engine 120 can pass the training data packet to another switch or another node for use by the other switch or the other node. For example, the other switch can also perform learning of a classifier based on the training data packet received by the other switch.

Figure 5:
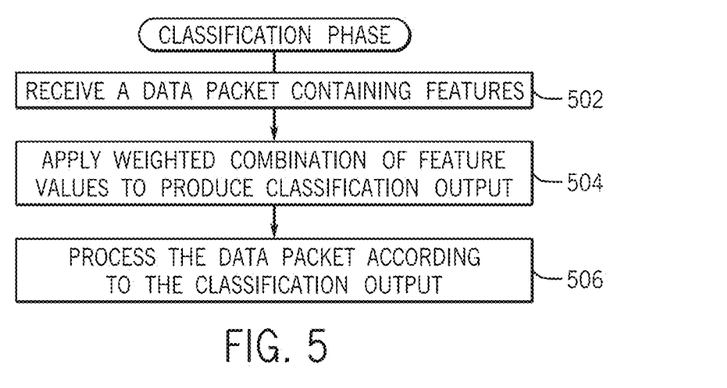
FIG. 5 is a flow diagram of an example classification phase according to some implementations.

FIG. 5 is a flow diagram of an example process of the classification phase. In some implementations, the classification phase can be performed by the learned classifier 124 executing on the switch 104. Alternatively, the classification phase can be performed by a different node, such as by a server computer (or server computers) to which the classifier 124 (or a representation of the classifier 124) has been sent by the switch 104.

The classifier 124 receives (at 502) an (unlabeled) data packet containing features. For example, the features can be various fields of the data packet associated with a network protocol, such as the OpenFlow protocol. In other examples, the features can be various fields of a data packet according to another network protocol.

The classifier 124 applies (at 504) a weighted combination of the feature values in the data packet to produce a classification output for the data packet, where the classification output can indicate whether or not the data packet is positive or negative for a given category (or multiple categories). The switch 104 can process (at 506) the data packet according to the classification output. For example, various rules can be specified for processing the data packet based on the classification output. The rules can specify that the data packet that is classified as positive (or negative) with respect to a category be dropped. Alternatively, the rules can specify that the data packet classified as positive (or negative) with respect to the category be forwarded to a specific destination. As yet another example, the data packet that is classified as positive (or negative) with respect to a category can be modified, such as by modifying the packet to tag the packet as being positive (or negative) with respect to the category.

As a more specific example, the category can be spam. If a data packet is classified as being positive for spam, then the switch 104 can drop the data packet. However, if the data packet is classified as being negative for spam, then the switch 104 can forward the data packet to an intended destination.

Figure 6:
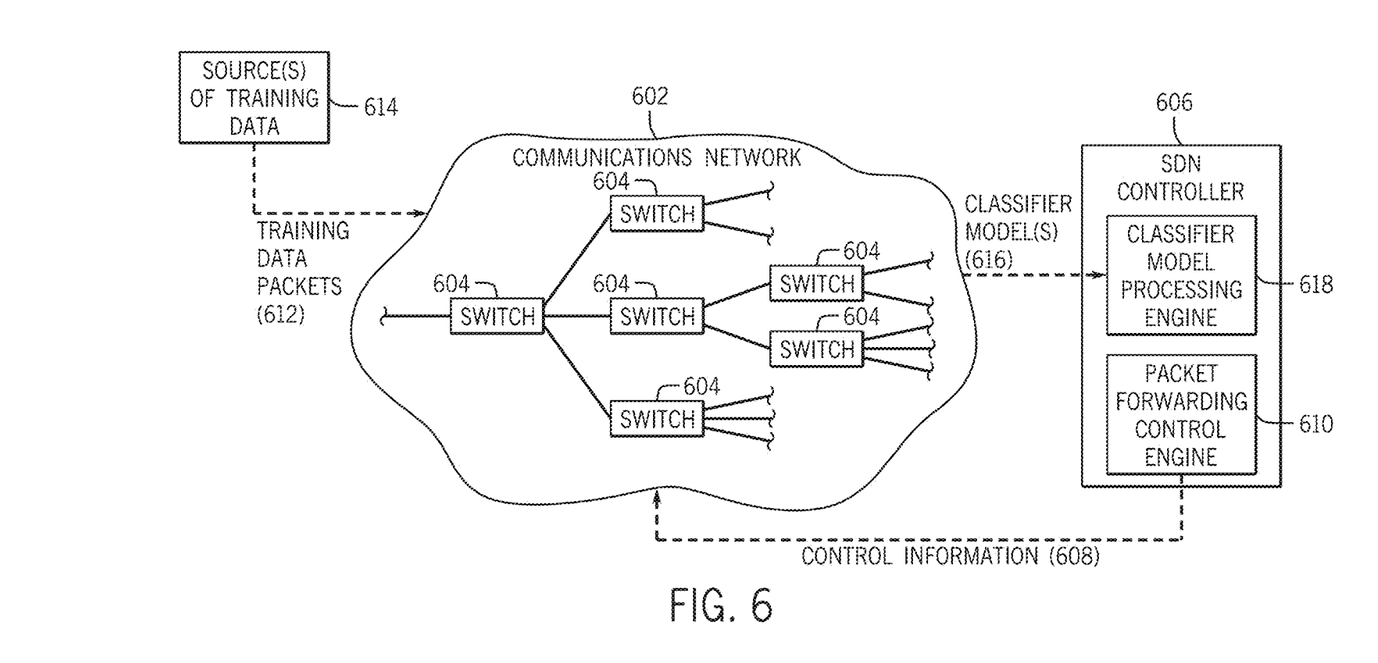
FIG. 6 is a block diagram of another example arrangement that includes a communications network, switches, a source of training data, and a controller, in accordance with some implementations.

FIG. 6 is a schematic diagram of another example arrangement that includes a communication network 602 that contains various switches 604. At least some of the switches 604 are configured in similar fashion as the switch 104 of FIG. 1. Such switches 604 can include the learning engine 120 for learning a classifier. In some examples, some of the switches 604 may not include the learning engine 120.

In some implementations, the communications network 602 operates according to a Software-Defined Networking (SDN) technique, where a control plane and a data plane are separated. The control plane is implemented using one or multiple SDN controllers 606, while the data plane is implemented with the switches 604 in the communications network 602. The control plane can make decisions about how traffic is to be forwarded through the communications network 602. The control plane, including the SDN controller(s) 606, can send control information 608 to the switches 604 to control forwarding of traffic data packets by the switches 604. In some examples, a communications mechanism between the SDN controller 606 and the switches 604 is according to the OpenFlow protocol discussed above.

The control information 608 is provided by a packet forwarding control engine 610 in the SDN controller 606. The control information 606 provided by the packet forwarding control engine 610 can update forwarding information (e.g. 110 in FIG. 1) of the switches 604.

In accordance with some implementations, the control information 608 provided by the packet forwarding control engine 610 can also control how training data packets 612 provided by one or multiple training data sources 614 are to be forwarded by certain switches 604 in the communications network 602. In some examples, a subset of the switches 604 can include the learning engine 120 discussed in connection with FIG. 1 for learning classifiers. The control information 608 from the packet forwarding control engine 610 can control how training data packets 612 are to be directed to the subset of switches 604 that include learning engines 120.

In some implementations, once classifiers are learned, representations of the learned classifiers (in the form of classifier models that can include the weights assigned to features of each classifier) can be sent by respective switch(es) 604 to a classifier model processing engine 618 in the SDN controller 606. The classifier model processing engine 618 can read the classifier model(s) 616 to understand the classifier model(s) 616 and what the classifier model(s) 616 indicate(s) about the training data packets. The classifier model(s) 616 can be saved by the classifier model processing engine 618 for later use, or alternatively, can be shared with another node, such as another switch 604 or a server computer. The shared classifier model can be used by the switch or server computer to perform classification of data.

In further implementations, a composite or ensemble classifier can be produced based on learned classifiers from multiple switches. Multiple learned classifiers can be combined into a composite classifier. To classify a given data packet, the multiple classifiers of the composite classifier can produce their respective outputs; a majority voting technique can then be applied to classify the data packet (e.g. the data packet is classified as belonging to a category if a majority of the classifiers of the composite classifier output a positive indication).

As noted above, in some examples, training data packets that have been used by a switch (e.g. switch 604 in FIG. 6) can be dropped by the switch after a classifier is learned. In this case, the training data packets 612 are consumed by the respective switches 604 as corresponding classifiers are learned. In this manner, the amount of traffic in the communications network 602 can be reduced as training data packets are consumed and dropped by the switches 604.

With such implementations, training data packets 612 do not have to make their way through the entire communications network 602 to some destination, which can reduce the amount of network bandwidth associated with learning classifiers.

In other examples, the training data packets 612 do not have to be dropped by the switches 604, but rather, can be forwarded to a specified destination (or destinations).

In some examples, a classifier learned by the switch 104 or 604 can be used in one of various applications. A first application involves network traffic profiling, where traffic data packets in the communications network 102 or 602 are classified (i.e. profiled), such as to classify traffic data packets as normal data packets or suspect data packets (data packets associated with spam, malware, and so forth). The features of a data packet that can be used for classification for network traffic profiling can include any or some combination of the following: source and destination MAC addresses, source and destination IP addresses, source and destination Transmission Control Protocol (TCP) port numbers, and so forth. In addition to the foregoing features, classification of a data packet can be based on additional features, such as bandwidth use over time, or other metrics.

Once a classifier is learned by the switch, the switch can apply the learned classifier to new traffic data packets to perform network traffic profiling. Any suspect traffic data packets can be copied by the switch to the SDN controller(s) 606 for further processing, in some examples.

Also, in further examples, the representation of a classifier learned by a switch can be communicated to the SDN controller 606, which can use the representation of the classifier as a summary of network traffic in a communications network.

Another application of the learned classifier 124 in the switch 104 or 604 is classification of application data. Application data can be stored in a database or other type of storage structure. Classification of application data can be used for various purposes that are specific to a corresponding application. For example, the application can be an application for identifying interests of customers (e.g. whether customers are interested in specific products, features of products, services, and so forth). Another example of an application can be an application related to identifying sentiments expressed by customers or users with respect to various topics. The switches of the communications network can provide labeled data packets to a specific destination, which can use the labeled data packets for the specific purpose of a corresponding application.

Figure 7:
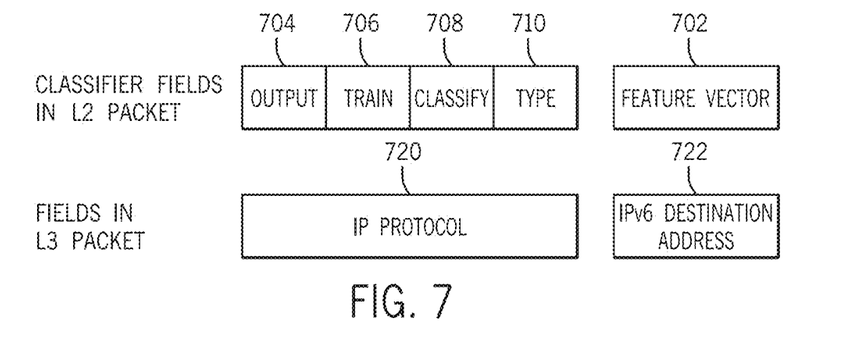
FIG. 7 is a schematic diagram of mapping fields in a layer 2 (L2) packet to fields in a layer 3 (L3) packet, according to some examples.

FIG. 7 shows an example of how layer 2 (L2) data packets can be used in classification tasks according to some implementations. As shown in FIG. 7, fields in an L2 data packet relevant to classification tasks according to some implementations include a feature vector 702, which includes various features used for training a classifier and used by the classifier to classify a data packet. Other specially designated fields can also be defined, including an Output field 704 (which is to carry a label for a category, i.e. whether the data packet is positive or negative for the category), a Train field (which is settable to a first value to indicate that the data packet is a training data packet, and to a second value to indicate that the data packet is not a training data packet), a Classify field (to indicate that the data packet is to be classified by a classifier), and a Type field 710 that can identify a type (e.g. specific user or group of users, specific application, specific type of data, etc.).

FIG. 7 also shows a mapping between the fields 702, 704, 706, 708, and 710, and respective fields in a layer 3 (L3) data packet in which the L2 data packet can be carried. In some examples, fields of the L3 data packet can include an IP Protocol field 720 and an IPv6 (IP version 6) destination address field 722. In some examples, the IP Protocol field and 720 and IPv6 destination address field 722 can include portions that are unused by a specification that defines the IP protocol, and thus, can be used to carry the L2 fields 702, 704, 706, 708, and 710.

A training data packet is indicated by the Train field being set to "1", for example, and the Output field 704 containing a label for a specific category (i.e. whether the trained data packet is positive or negative for the category). Values of features in the feature vector 702 are then used for learning a classifier, according to some implementations as discussed above.

If a data packet is not a training data packet, but rather, a data packet that is to be classified, then the Train field 706 can be set to "0", and the Output field 704 would not be set to a valid label. Rather, the Classify field 708 can be set to "1" to indicate that the data packet is to be classified based on the features in the feature vector 702.

As noted above, in some examples, a switch (e.g. switch 104 in FIG. 1 or switch 604 in FIG. 6) can operate according to the OpenFlow protocol. Although reference is made to an OpenFlow switch according to some examples, it is noted that in other examples, other types of switches can be employed.

In some cases, an OpenFlow switch can include a number of chained flow tables (flow tables arranged in series) that can be used in classification tasks (a training phase and a classification phase). For example, a first flow table can be used to determine, based on the Train field 706 and the Classify field 708 of FIG. 7, whether the data packet is a training data packet or a data packet to be classified. A second flow table can be used to determine, based on the Type field 710, whether the data packet is of a type for which classifier training or classification is to be performed. Another flow table can be used to perform training or classification based on the feature vector 702.

In this disclosure, using a flow table as noted above refers to matching the respective fields of a data packet to entries of the flow table to determine an action to take. For example, the values of the Train field 706 and the Classify field 708 can be compared to entries of the first flow table. If a match to an entry in the first flow table is indicated, then a respective action specified by the first flow table entry is performed. Matches of other fields of the data packet to entries of other flow tables can similarly cause other actions to be performed.

Figure 8:
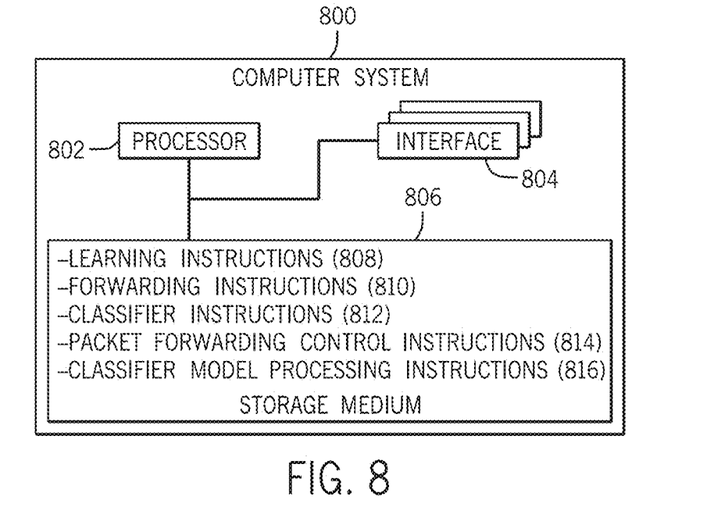
FIG. 8 is a block diagram of an example computer system according to some implementations.

FIG. 8 is a block diagram of an example computer system 800 according to some implementations. The computer system can include a single computer node, or a collection of computer nodes. In some examples, the computer system 800 can be used to implement the switch 104 or 604 depicted in FIG. 1 or 6, respectively. In other examples, the computer system 800 can be used to implement the SDN controller 606 of FIG. 6.

The computer system 800 includes a processor (or multiple processors 802), which can be coupled to one or multiple interfaces 804. A processor can include a microprocessor, microcontroller, physical processor module or subsystem, programmable integrated circuit, programmable gate array, or another physical control or computing device.

If the computer system 800 is a switch 104 or 604, then there would be multiple interfaces 804 for connection to respective ports of the switch that are connected to corresponding links of the communications network 102 or 602.

The computer system 800 also includes a non-transitory computer-readable or machine-readable storage medium (or storage media) 806, which can store machine-readable instructions as well as data. In examples where the computer system 800 implements a switch, the computer-readable instructions can include learning instructions 808 (which can be part of the learning engine 120 of FIG. 1), forwarding instructions 810 (which can be part of the data packet forwarding engine 106 of FIG. 1), and classifier instructions 812 (which can implement the classifier 124 of FIG. 1).

In examples where the computer system 800 implements the SDN controller 606 shown in FIG. 6, the computer-readable instructions can include packet forwarding control instructions 814 (which are part of the packet forwarding control engine 610 of FIG. 6), and the classifier model processing instructions 816 (which can be part of the classifier model processing engine 618).

The storage medium (or storage media) 806 can include one of or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
receiving, by a switch, a first data packet including features and training information;
determining, by the switch, whether the first data packet belongs to a category by comparing values of the features of the first data packet to values of the category;
comparing, by the switch, the determination whether the first data packet belongs to the category to a portion of the training information relevant to the category;
learning, by the switch, a classifier based on the first data packet, the classifier useable to classify data into at least one category.

2. The method of claim 1, further comprising:
applying network traffic classification, by the classifier in the switch, on a given data packet; and
processing, by the switch, the given data packet based on an output of the network traffic classification and according to a rule.

3. The method of claim 2, wherein processing the given data packet comprises at least one task selected from among dropping the given data packet, forwarding the given data packet to a destination, and modifying the given data packet.

4. The method of claim 1, further comprising:
applying classification, by the classifier in the switch, on unlabeled application data for at least one application; and
outputting, by the classifier, the labeled application data that is labeled with respect to the at least one category.

5. The method of claim 1, wherein the first data packet includes features and a label for the at least one category, and wherein learning the classifier comprises producing weights for the features.

6. The method of claim 5, wherein the features include fields according to an OpenFlow protocol.

7. The method of claim 1, further comprising dropping, by the switch, the first data packet after the first data packet is used for learning the classifier.

8. The method of claim 1, further comprising sending, by the switch, the first data packet to another node.

9. A switch for use in a communications network, comprising:
a data packet forwarding engine to:
receive a data packet over a link and to forward the data packet to a link towards a destination based on forwarding information,
determine whether the data packet belongs to a category by comparing values of features of the data packet to values of the category, and
compare the determination whether the data packet belongs to the category to a portion of training information of the data packet relevant to the category; and
a learning engine to learn a classifier based on training data that includes the data packet and other data packets labeled with respect to at least one category.

10. The switch of claim 9, wherein the switch is to send a representation of the learned classifier to another node.

11. A system comprising:
a plurality of switches for forwarding data packets according to forwarding information associated with the switches,
wherein at least one of the switches is to:
receive a training data packet including features and training information over a link;
determine whether the training data packet belongs to a category by comparing values of the features of the training data packet to values of the category;
compare the determination whether the training data packet belongs to the category to a portion of training information of the training data packet relevant to the category; and
learn a classifier for classifying data with respect to at least one category, the learning of the classifier responsive to training data received by the at least one switch.

12. The system of claim 11, further comprising a controller to program at least another of the switches to forward the training data to the at least one switch.

13. The system of claim 12, wherein the controller comprises a Software-Defined Networking (SDN) controller.

14. The system of claim 11, wherein a second of the switches is to learn a second classifier to classify data with respect to at least another category based on training data received by the second switch, and wherein the learned classifiers are for combination into an ensemble classifier.

\* \* \* \* \*